United States Patent [19]

Nakajima et al.

[11] Patent Number: 5,194,805
[45] Date of Patent: Mar. 16, 1993

[54] INDUCTANCE-TYPE DISPLACEMENT SENSOR FOR ELIMINATING INACCURACIES DUE TO EXTERNAL MAGNETIC FIELDS

[75] Inventors: Atsushi Nakajima; Minoru Takizawa; Chikara Murakami, all of Tokyo; Yoichi Kanemitsu; Yuji Shirao, both of Kanagawa, all of Japan

[73] Assignees: National Aerospace Laboratory, Ebara Research Co., Ltd.; Ebara Corporation, both of Tokyo, Japan

[21] Appl. No.: 633,849

[22] Filed: Dec. 26, 1990

[30] Foreign Application Priority Data

Dec. 29, 1989 [JP] Japan .................................. 1-342773
Dec. 29, 1989 [JP] Japan .................................. 1-342774

[51] Int. Cl.$^5$ .......................... G01B 7/14; G01R 33/02
[52] U.S. Cl. .............................. 324/207.16; 324/232; 324/234; 324/207.12
[58] Field of Search .................. 324/207.11-207.26, 324/225, 226, 227, 232, 234-238, 239, 243, 260-262, 173, 174; 336/132-135

[56] References Cited

U.S. PATENT DOCUMENTS

| | | | |
|---|---|---|---|
| 3,197,693 | 7/1965 | Libby | 324/233 X |
| 3,336,525 | 8/1967 | Church | 336/134 X |
| 3,368,142 | 2/1968 | Bouchard et al. | 336/135 X |
| 3,586,964 | 6/1971 | Strauch | 324/207.12 X |
| 3,723,862 | 3/1973 | Wentzel et al. | 324/236 |
| 3,753,096 | 8/1973 | Wiers | 324/233 |
| 3,764,897 | 10/1973 | Greenwood | 324/233 X |
| 4,845,429 | 7/1989 | Burreson | 324/207.19 X |
| 4,866,318 | 9/1989 | Habermann et al. | 324/207.16 X |

FOREIGN PATENT DOCUMENTS

| | | |
|---|---|---|
| 3514154 | 10/1986 | Fed. Rep. of Germany . |
| 2214890 | 4/1976 | France . |
| 58-41304 | 3/1983 | Japan . |
| 59-67404 | 4/1984 | Japan . |
| 63-277902 | 11/1988 | Japan .................... 324/207.12 |
| 2105475 A | 3/1983 | United Kingdom . |

Primary Examiner—Gerard R. Strecker
Assistant Examiner—Warren S. Edmonds
Attorney, Agent, or Firm—Armstrong, Westerman, Hattori, McLeland & Naughton

[57] ABSTRACT

An inductance-type displacement sensor which can measure the displacement of a measured object of magnetic material without any contact with the object. A pair of series connected coils is provided adjacent to the object so that the inductance of the coils varies in response to a displacement of the object from a predetermined position. The inductance, the number of windings, the direction of the windings and the section of each of the cores are so set that the magnetic flux produced by one of the coils runs in a direction opposite to that of the magnetic flux produced by the other coil and the densities of the respective magnetic fluxes are identical with each other.

10 Claims, 7 Drawing Sheets

INDUCTANCE-TYPE DISPLACEMENT SENSOR FOR ELIMINATING INACCURACIES DUE TO EXTERNAL MAGNETIC FIELDS

BACKGROUND OF THE INVENTION

1. Field of the Invention

This invention relates to a displacement sensor for detecting displacement of a measured magnetic object and, particularly, to an inductance-type displacement sensor which is little affected by noise resulting from an external magnetic field.

2. Prior Art

An inductance-type displacement sensor can be used for detecting displacement of a measured object made of a magnetic material. FIG. 1 shows an example of such a displacement sensor, FIG. 1(a) being a sectional view thereof positioned adjacent to a measured object and FIG. 1(b) being a side view. As shown in these figures, the displacement sensor includes a sensor core 100 having an E-like shape in section and integrally formed with a post-like magnetic pole 101, a cylindrical magnetic pole 102 positioned to surround the magnetic pole 101 and a base portion 103 connecting both magnetic poles, and a sensor coil 104 wound around the central magnetic pole 101. A dummy coil 105 provided outside the sensor is connected in series with the sensor coil 104, as shown in FIG. 2, and a carrier wave from a carrier wave generating circuit 106 is applied to the series circuit of the sensor and dummy coils 104 and 105. A detection circuit 107 is connected parallel to the dummy coil 105.

When a measured object of magnetic material 110 is displaced towards or away from the displacement sensor, the inductance of the sensor coil 104 varies. A change in electric potential across the dummy coil 105 due to a change in inductance of the sensor coil is detected by the detection circuit 107 whereby the displacement of the object 110 is detected.

Using such an inductance-type displacement sensor, a displacement detecting system can be made for detecting a displacement of, for example, a cylindrical or post-like shaft made of a magnetic material. FIG. 3 shows four sensor cores 211, 212, 213 and 214 which are arranged on two orthogonally intersecting axes X and Y and spaced circumferentially about measured magnetic shaft 220. Sensor coils 201, 202, 203 and 204 are wound on the sensor cores 211, 212, 213 and 214, respectively.

When the shaft 220 is displaced from a predetermined position in a Y-direction, for example, the inductance of the sensor coils 201 and 203 is varied, and when displaced in an X-direction, then the inductance of the sensor coils 202 and 204 is varied. By detecting the changes in inductance, the displacement of the object 220 is detected. For this purpose, a pair of opposite sensor coils is connected in series to a carrier wave generating circuit, and a detection circuit is connected in parallel to either one of the sensor coils connected in series. FIG. 4 shows an example of such an arrangement in which the sensor coils 201 and 203 are connected in series with a carrier wave generating circuit 215 and thus a magnetic flux 206 is generated by the sensor coil 201, for example. A detection circuit 216 is connected in parallel to the other sensor coil 203. If the shaft 220 is displaced in the Y-direction, the inductance of the sensor coils 201 and 203 is varied and this variation in inductance is detected by the detection circuit 216.

When the inductance-type displacement sensor shown in FIG. 1 is operated in a location in which an external magnetic flux EFX passes through the sensor core 100, as shown in FIG. 5, the external magnetic flux EFX causes an electromotive force EMF to be generated in the sensor coil 104 by mutual induction, as shown in FIG. 2. Since this electromotive force EMF is superimposed on the change in electric potential resulting from the change in inductance due to the displacement of the measured object 110, a noise is superimposed on the displacement signal to be output from the detection circuit 107.

Such a situation also takes place in the displacement detecting system shown in FIG. 3. Since a pair of opposite sensor coils is connected in series, as shown in FIG. 4, an electromotive force EMF is generated, as shown in FIG. 4, in the sensor coil 201 by the mutual induction when an external magnetic flux 207 is received by the sensor coil 201. The signal generated by this electromotive force is superimposed on the change in electric potential resulting from the change in inductance of the sensor coils 201 and 203 due to the change in position of the shaft 220, and thus a noise is superimposed on the displacement signal output from the displacement sensor.

SUMMARY OF THE INVENTION

The present invention has been made in view of the above-mentioned problems, and it is an object of the invention to provide an inductance-type displacement sensor by which a noise caused by an external magnetic flux is reduced by cancelling electromotive forces produced in sensor coils by an external magnetic flux.

Another object of the invention is to provide a displacement detecting system in which the electromotive forces generated in the sensor coils by a magnetic flux from the exterior is cancelled and any mutual interference between the sensor coils can be prevented.

To attain the above-mentioned objectives, the inductance-type displacement sensor in accordance with the present invention is capable of measuring a displacement of an object of magnetic material without any contact with the object and comprises a pair of coils connected in series and provided adjacent to the object such that the inductance of the pair of coils varies in response to the displacement of the object from a predetermined position. The inductance, the number of windings, the direction of the windings and the cross section of each of the cores are set so that the magnetic flux produced by one of the coils runs in a direction opposite to that of the magnetic flux produced by the other coil, and the densities of both of the magnetic fluxes are equal to each other.

More particularly, the inductance-type displacement sensor of the present invention comprises:

a core means of magnetic material located adjacent to an object; and a pair of coils wound concentrically around the magnetic core means and connected in series with each other, the inductance of the coils being substantially identical and varying in response to the displacement of the object from the predetermined position, the respective coils being wound so that the magnetic flux produced by one of the coils runs in a direction opposite to that of the magnetic flux produced by the other coil, and the number of windings and the cross sections of each of the cores are set so that the means magnetic flux densities in the respective coils are equal to each other.

In the first embodiment of the present invention, the core means includes a central magnetic pole, two different, concentrically cylindrical magnetic poles provided around the central magnetic pole, and a base portion for connecting these magnetic poles, one of the coils of the pair being wound around the central pole and the other coil between said two magnetic poles.

In the second embodiment of the invention, the core means includes a pair of magnetic poles, and a base portion for connecting the poles, and the coils of the pair are wound around the magnetic poles, respectively.

Further, the present invention provides a displacement detecting system in which two pairs of the displacement sensors of the first or second embodiment are located in opposite positions relative to the object on first and second lines passing through the object and orthogonally intersecting with each other. The coils of one of the displacement sensors located on one of the lines are connected in series with the coils of the other displacement sensor located on the same line. The magnetic fluxes are generated by the coils which are on different lines and adjacent to each other to cause the same magnetic polarity to be formed on the sides of the coils adjacent to the object.

The above and other objects and advantages will more be clearly understood by reading the following detailed description with reference to the accompanying drawings.

DETAILED DESCRIPTION OF THE PREFERRED EMBODIMENTS

Figure 1A:
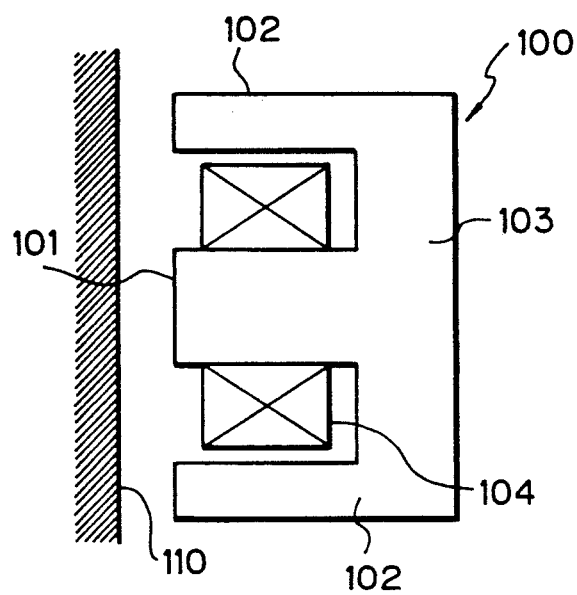
FIG. 1(a) is a sectional view of an example of an inductance-type displacement sensor.
Figure 1B:
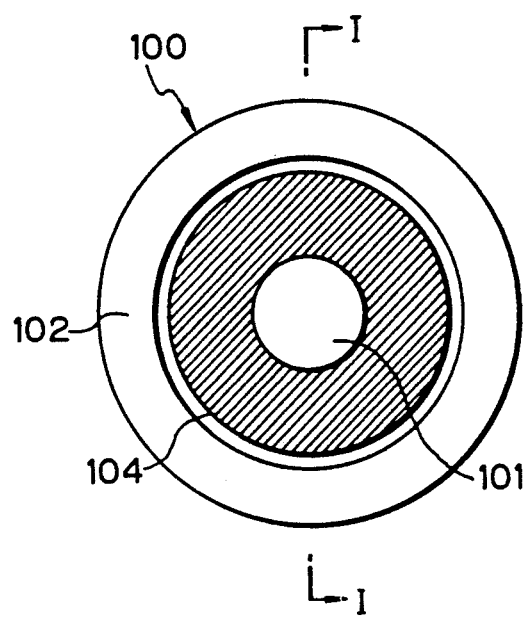
FIG. 1(b) is a side view of the displacement sensor.
Figure 2:
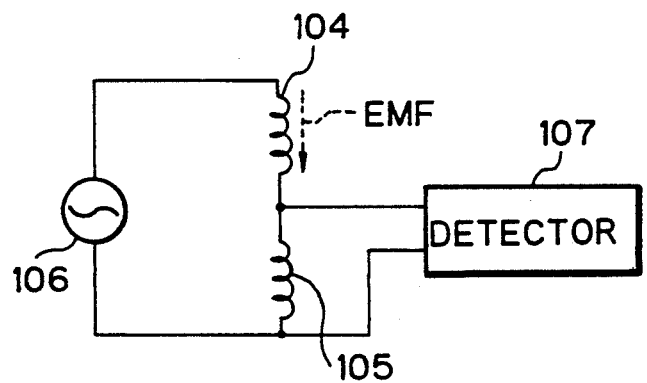
FIG. 2 is a diagram showing the circuit construction of the displacement sensor of FIG. 1.
Figure 3:
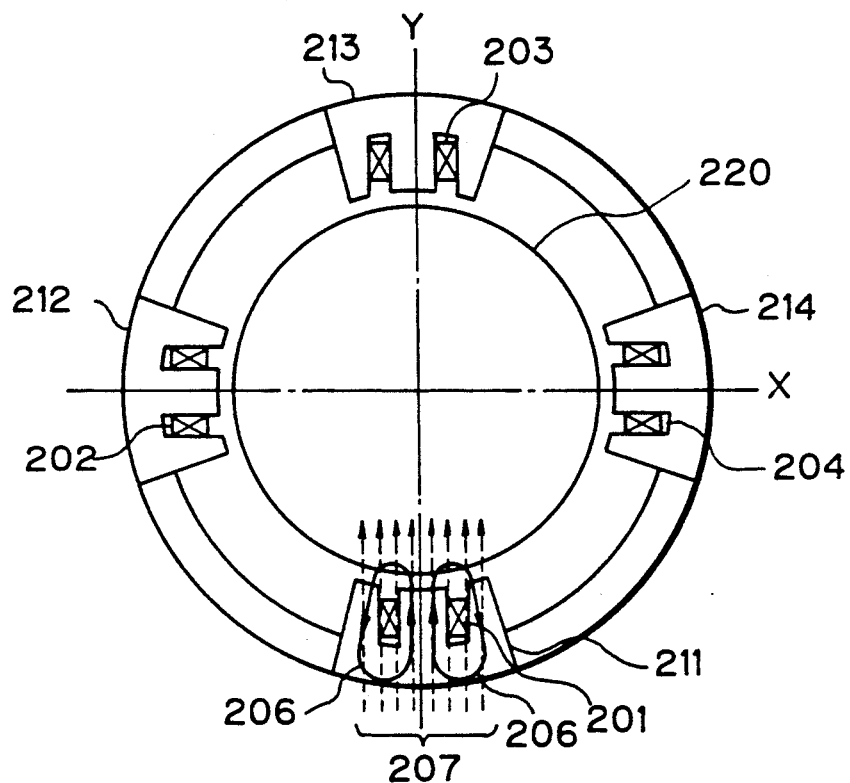
FIG. 3 is a sectional view showing an example of a displacement measuring system using the displacement sensors shown in FIG. 1.
Figure 4:
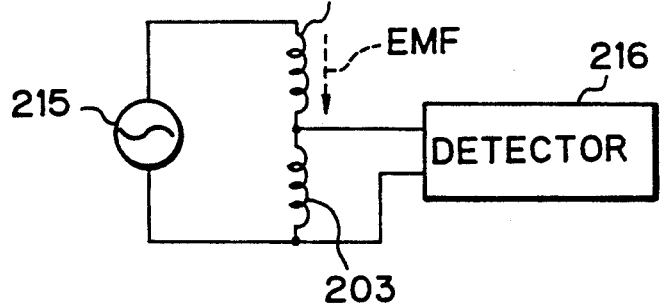
FIG. 4 is a diagram showing the circuit construction of the displacement measuring system shown in FIG. 3.
Figure 5:
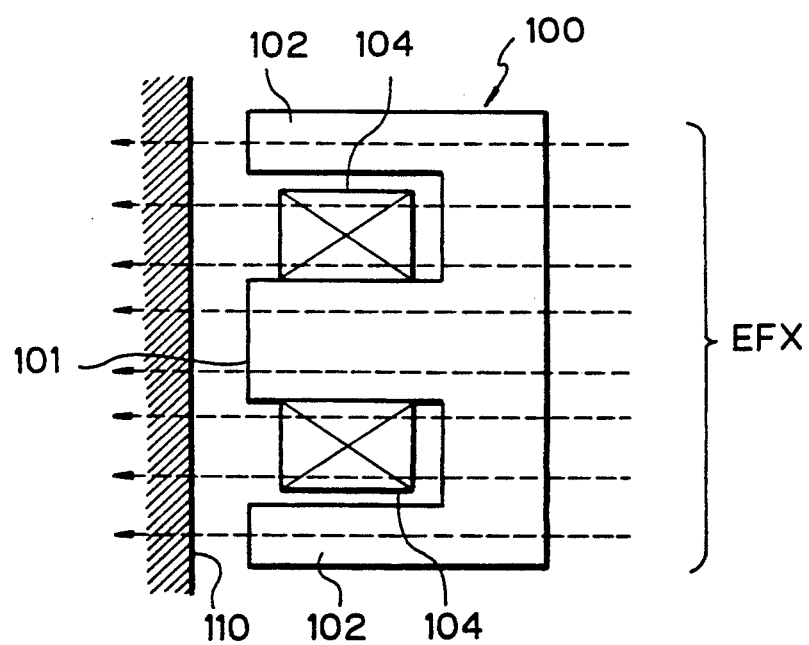
FIG. 5 shows a case where an external magnetic flux penetrates the inductance-type displacement sensor of FIG. 1.
Figure 6A:
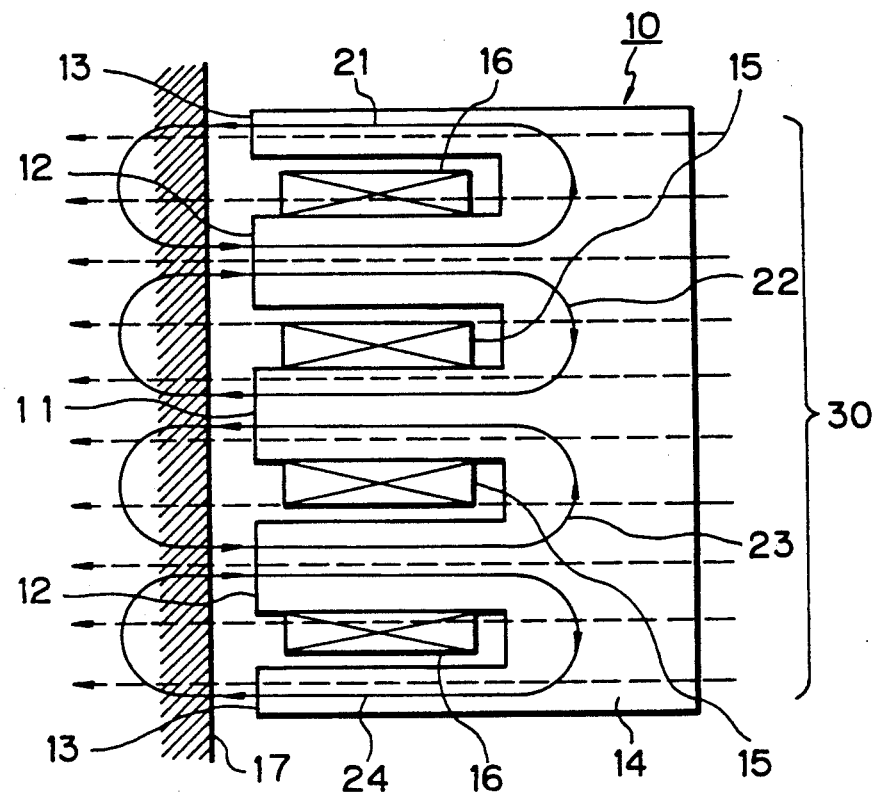
FIG. 6(a) is a sectional view of a first embodiment of an inductance-type displacement sensor in accordance with the present invention wherein magnetic fluxes generated by respective coils as well as of a noise are also shown.
Figure 6B:
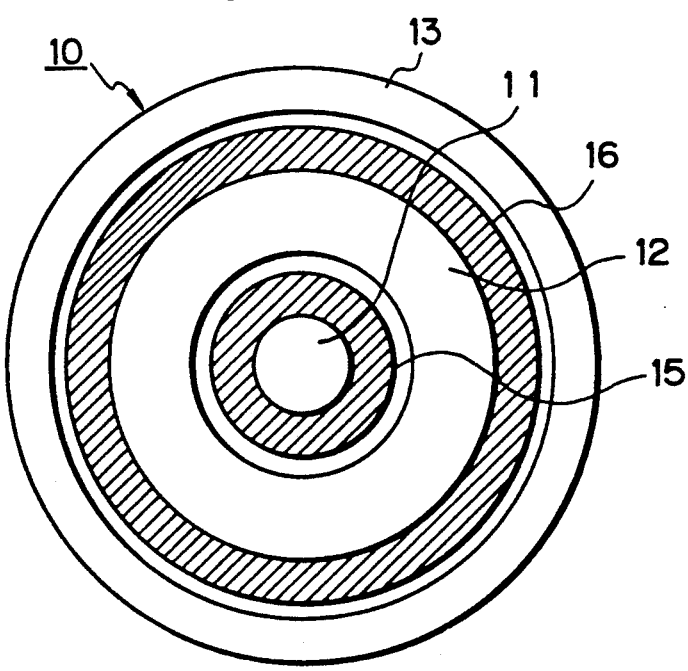
FIG. 6(b) is a side view of the sensor shown in FIG. 6(a)

FIGS. 6(a) and 6(b) show the arrangement of the first embodiment of the inductance-type displacement sensor in accordance with the present invention, FIG. 6(a) being a sectional view of the sensor and FIG. 6(b) being a side view thereof. Referring to these drawings, a sensor core 10 is made of a ferromagnetic material and includes a post-like magnetic pole 11 positioned at its center, first and second cylindrical magnetic poles 12, 13 surrounding the pole 11, and a base portion 14 for connecting the magnetic poles 11, 12 and 13 at their one end to integrally form these poles 11–13 and the base portion 14. Disposed between the poles 11 and 12 is a first sensor coil 15 wound around the magnetic pole 11, and between the magnetic poles 12 and 13 is disposed a second sensor coil 16 wound around the magnetic pole 12. The first and second magnetic coils 15 and 16 are connected in series with each other and wound such that magnetic fluxes are generated by the coils 15 and 16 in opposite directions relative to each other.

Figure 7:
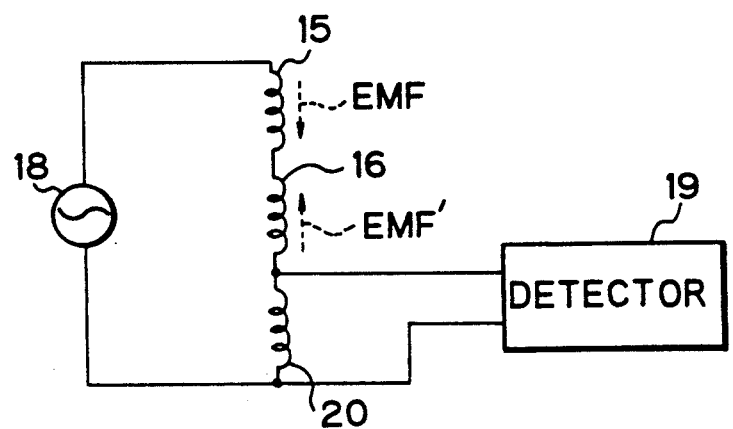
FIG. 7 is a diagram showing the circuit construction of the displacement sensor of FIG. 6 and the orientation of electromotive forces produced in coils.

In operation, when a measured object 17 made of a magnetic material is displaced towards or away from the sensor core 10, the inductance of the sensor coils 15 and 16 is varied. FIG. 7 is a diagram showing a circuit of the displacement sensor according to the present invention in which the sensor coils 15, 16 and a dummy coil 20 provided outside the sensor core 10 are connected in series, as shown in the drawing, and a carrier wave is applied to the opposite ends of this circuit connected in series from a carrier wave generating circuit 18.

Thus, magnetic fluxes are generated on the magnetic poles 11, 12 and 13 by the carrier wave generating circuit 18 as shown by arrows 21, 22, 23 and 24 in FIG. 6(a), when viewed at an instant.

When the measured object 17 is displaced relative to the sensor core 10, the inductance of the sensor coils 15, 16 is varied and a resulting change in electric potential across the dummy coil 20 is detected by a detection circuit 19 to measure the displacement of the object 17.

In the case that the above-described inductance-type displacement sensor is used under the existence of an external magnetic field, when a magnetic flux 30 passes through the sensor core 10, as shown in FIG. 6(a), electromotive forces EMF and EMF' are generated by this magnetic flux 30 in the sensor coils 15 and 16 in opposite directions relative to each other, as shown in FIG. 7. When the number of windings and the cross section of each of the cores 11, 12 and 13 are set so that the inductance of one of the coils 15, 16 is the same as that of the other and mean magnetic flux densities are equal within the respective cores 11, 12, 13, the electromotive forces EMF and EMF' generated in the sensor coils 15, 16 are mutually cancelled whereby a considerable reduction in noise caused by the external magnetic field may be achieved.

Figure 8A:
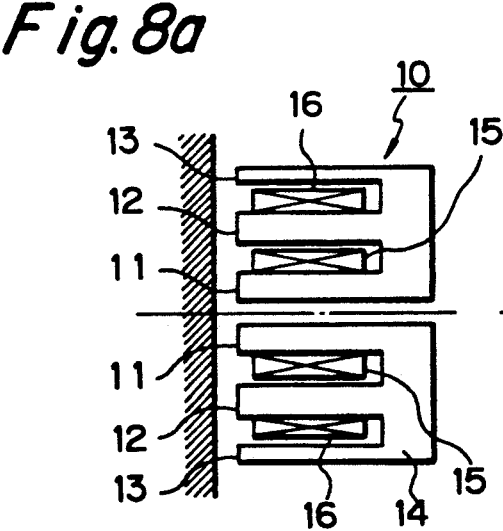
FIGS. 8(a) and 8(b) show a modified example of the displacement sensor of FIG. 6.
Figure 8B:
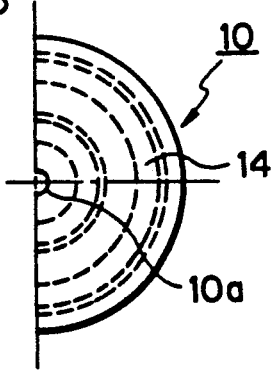

FIG. 8 shows a modification of the inductance-type displacement sensor according to the first embodiment, FIG. 8(a) being a longitudinal section thereof and FIG. 8(b) being a partial plan view thereof. As seen from these figures, the modification is different from the inductance-type displacement sensor of FIGS. 6(a) and 6(b) in that the sensor core 10 has a hollow center portion 10a extending through the magnetic pole 11.

As described above, according to the first embodiment of the present invention, the sensor coils are wound so that adjacent concentrically cylindrical magnetic poles have opposite polarities, and it is therefore possible to mutually cancel the electromotive forces generated in the coils by the magnetic flux entering thereinto from the exterior whereby noise caused by the external magnetic field are considerably reduced to attain a correct measurement of displacement of the object.

Figure 9:
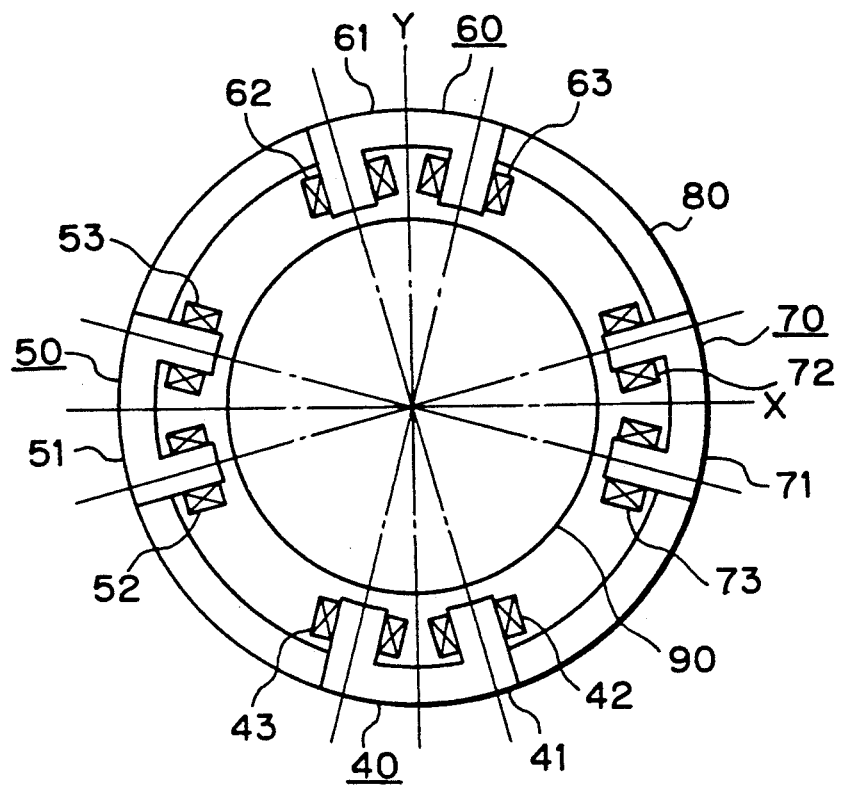
FIG. 9 is a sectional view of a displacement measuring system in which a second embodiment of an inductance-type displacement sensor according to the invention is arranged around a measured object.

FIG. 9 schematically shows a second embodiment of an inductance-type displacement sensor applied for detecting a displacement of a shaft of a ferromagnetic material wherein the inductance-type displacement sensors of the second embodiment of the invention are symmetrically located on orthogonally intersecting axes. Referring to the drawing, four displacement sensors of the second embodiment of the invention are shown by reference numerals 40, 50, 60 and 70. Since these sensors are similarly arranged, the displacement sensor 40 will only be described as an example.

Figure 10:
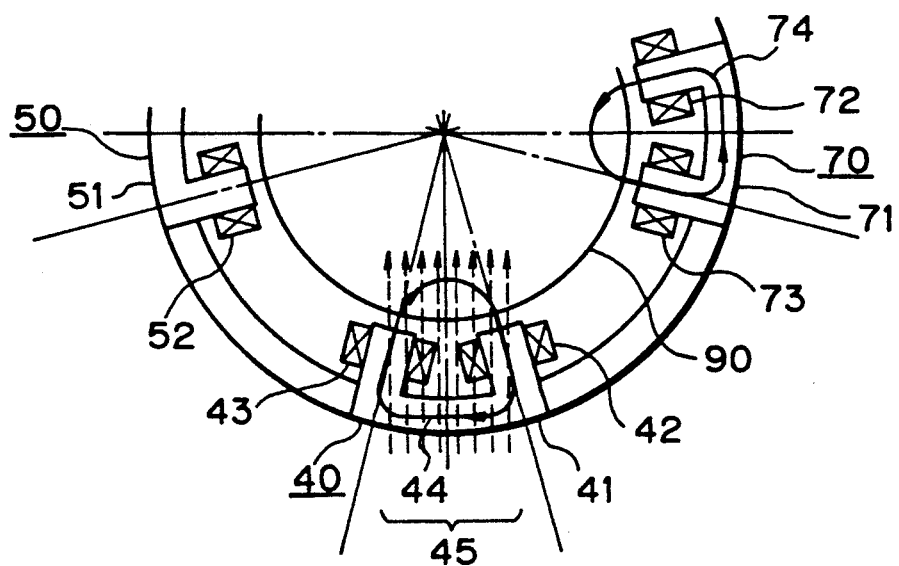
FIG. 10 shows directions of a magnetic flux generated by coils of the displacement measuring sensor of FIG. 9 as well as of an external flux.

The displacement sensor 40 includes a U-shaped sensor core 41 made of a ferromagnetic material and a pair of sensor coils 42 and 43 wound around the respective magnetic poles. The pair of sensor coils 42, 43 is connected in series with each other and wound around the magnetic poles so that the magnetic fields generated by the respective sensor coils are directed so as to be opposite to each other. In FIG. 10, the orientation of a magnetic field 44 generated at an instant by the sensor coils 42, 43 is shown by a solid line. With this arrangement, even when a magnetic field 45 shown by dotted lines in FIG. 10 enters into the displacement sensor 40 axially with the sensor coils 42 and 43 from the exterior, electromotive forces generated by this magnetic field 45 in the sensor coils 42 and 43 are directed opposite to each other and thus electric currents produced by these electromotive forces in the sensor coils 42, 43 are cancelled.

The displacement detecting system shown in FIG. 9 will now be described. Referring to the drawing, four sensor cores 41, 51, 61 and 71 are secured to and arranged on an annular support member 80 with a gap provided between the respective sensor cores and such a post-like measured object 90 as a shaft. The sensor core 41 is provided with a pair of sensor coils 42, 43 around its poles; similarly the sensor core 51 with a pair of sensor coils 52, 53; the sensor core 61 with a pair of sensor coils 62, 63; and sensor core 71 with a pair of sensor coils 72, 73. If the measured object 90 is displaced in a Y-direction, the inductances of the sensor coils 42, 43 and of the sensor coils 62, 63 will vary, and if the object 90 is displaced in an X-direction, then the inductances of the sensor coils 52, 53 and of the sensor coils 72, 73 will vary. Using such variations in the inductances, the displacement of the object 90 is detected.

Figure 11:
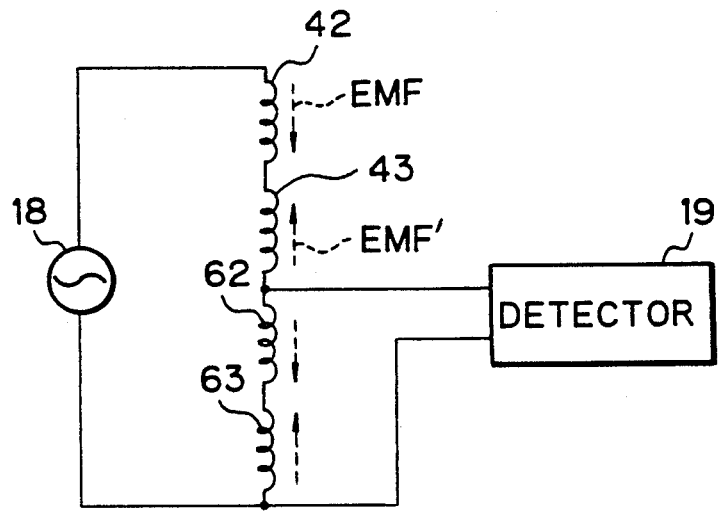
FIG. 11 is a diagram showing the circuit construction of the displacement measuring system of FIG. 10.

As described before, the sensor coils 42 and 43 in the displacement sensor 40 are connected in series and wound to generate magnetic fluxes in opposite directions. Similarly, the pair of sensor coils 52 and 53 in the displacement sensor 50; the pair of sensor coils 62 and 63 in the displacement sensor 60; and the pair of sensor coils 72 and 73 in the displacement sensor 70 are respectively connected in series and wound so that the magnetic fluxes generated by the respective coils are directed opposite to each other. Moreover, sensor coils of the displacement sensors positioned opposite to each other are connected in series with each other, and this series connected circuit is supplied at its opposite ends with a carrier wave from a carrier wave generating circuit, and a detection circuit is connected between the opposite ends of the series connected sensor coils of one of the displacement sensors. For example, the sensor coils 42, 43; 62, 63 of the opposing sensors 40, 60, the carrier wave generating circuit 18 and the detection circuit 19 are mutually connected as shown in FIG. 11. In this manner, magnetic fluxes 44 and 74 are, for example, generated in the displacement sensors 40 and 70, respectively, at an instant by the carrier wave supplied from the carrier wave generating circuits, as shown in FIG. 10.

Since the sensor coils 42 and 43 are provided as described above, when the magnetic flux 45 in the axial direction of these sensor coils enters into the displacement sensor 40, as shown in FIG. 10, electromotive forces EMF and EMF' are generated in the sensor coils 42 and 43 in opposite directions, as shown in FIG. 11, to be cancelled by each other. This will similarly take place in the sensor coils 62, 63 located on the opposite side with respect to the measured object 90.

Furthermore, as shown in FIG. 10, the magnetic fluxes generated by the sensor coils 42 and 73 located adjacent to each other and measuring displacements in different directions are formed to run in the same direction so that the same magnetic polarity is formed on the faces of the adjacent magnetic poles opposing the object 90. Thus, the magnetic fluxes generated by the adjacent sensor coils 42, 73 repulse each other to prevent the flux generated by one coil from passing through the other coil. As a result, no interference takes place between the sensor coils 42 and 73. Similarly, the sensor coils 43, 52, the sensor coils 53, 62 and the sensor coils 63, 72 are located so that the same magnetic polarity faces the object 90.

Figure 12:
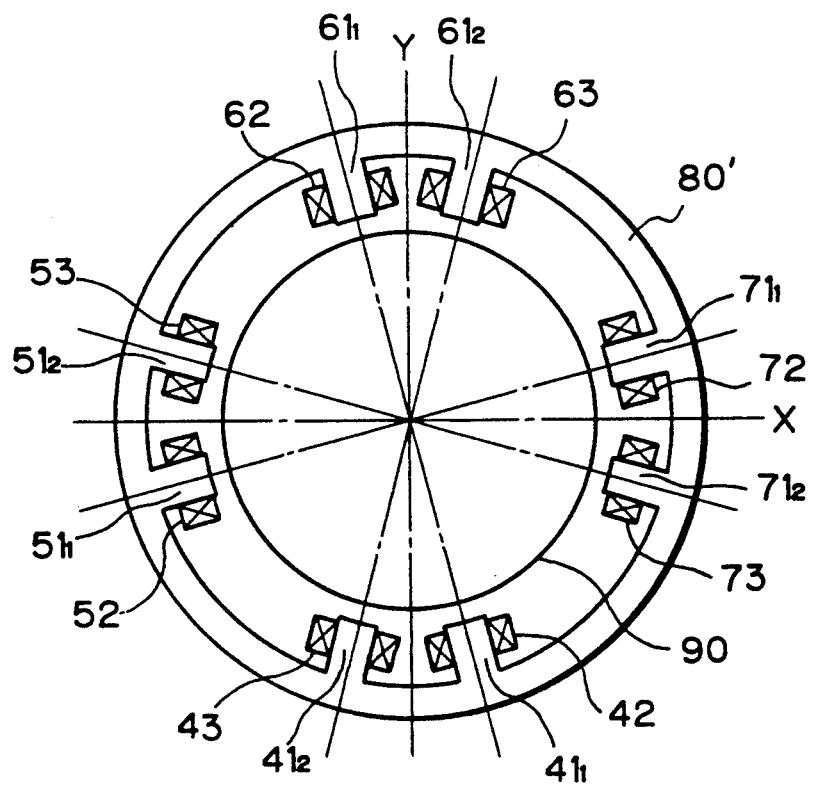
FIG. 12 shows a modified example of the displacement measuring system of FIG. 9.

FIG. 12 schematically shows the arrangement of a second embodiment of an inductance-type displacement sensor according to the present invention. As shown, an annular sensor core 80' of ferromagnetic material is provided circumferentially about the measured object 90, and magnetic poles $41_1$, $41_2$, $51_1$, $51_2$, $61_1$, $61_2$, $71_1$ and $71_2$ are integrally formed on the inner side of the annular core 80'. The magnetic poles $41_1$, $41_2$ correspond to the sensor core 41 of FIG. 9, the magnetic poles $51_1$, $51_2$ to the sensor core 51, the magnetic poles $61_1$, $61_2$ to the sensor core 61 and the magnetic poles $71_1$, $71_2$ to the sensor core 71. Thus, if the object 90 is displaced in a Y-direction, the inductance of the sensor coils 42, 43 and of the sensor coils 62, 63 vary, and if the object 90 displaces in an X-direction, the inductance of the sensor coils 52, 53 and of the sensor coils 72, 73 vary. By using such variations in inductance, the displacement of the object 90 can be detected.

Similar to the arrangement shown in FIG. 9, the sensor coils 42 and 43, the sensor coils 52 and 53, the sensor coils 62 and 63, and the sensor coils 72, 73 are respectively connected in series so that magnetic fluxes generated in each pair of sensor coils are mutually in opposite directions.

Also, the magnetic fluxes generated by the sensor coils 42 and 73 which are located adjacent to each other and measuring different directional displacements are formed to run in the same direction so that the same magnetic polarity faces the object 90. Thus, the magnetic fluxes generated by the sensor coils 42 and 73 repulse each other to prevent the generated by one coil from passing through the other sensor coil. As a result, no interference takes place between the sensor coils 42 and 73. Similarly, the sensor coils 43 and 52, the sensor coils 53 and 62, and the sensor coils 63 and 72 are located so that the magnetic fluxes are formed to have the same polarity face the object 90.

As described above, also with second embodiment, the electromotive forces produced by an external magnetic flux in the sensor coils connected in series are cancelled with each other thus enabling noise to be reduced to ensure a more correct measurement of displacement of the object.

Moreover, any mutual interference between sensor coils can be avoided, which will contribute a correct measurement of displacement of an object.

It is to be noted that the displacement sensors of the first embodiment can be disposed on two perpendicular lines passing through the object in opposite positions relative to the object, in order to form a displacement detecting system. Also in this case, an operation similar to that of the system shown in FIG. 9 can be performed.

The invention has been described in detail with particular reference to certain preferred embodiments thereof, but it will be understood that variations and modifications can be effected within the spirit and scope of the invention.

What is claimed is:

1. An inductance-type displacement detecting system having an inductance-type displacement sensor for measuring a displacement of an object of magnetic material without any contact with said object, the displacement sensor comprising:
 a pair of coils connected in series with each other and provided adjacent to said object wherein the inductance, the number of windings and the direction of the windings are so set that the magnetic flux produced by one of the coils runs in a direction opposite to that of the magnetic flux produced by the other coil, the densities of the respective magnetic fluxes being equal to each other;
 a third coil connected in series with said pair of coils;
 carrier wave generating means connected in series with said pair of coils and said third coil;
 detecting means for detecting a change in electric potential across said third coil due to a change in inductance of said pair of coils in response to the displacement of said object from a predetermined position.

2. A displacement detecting system as set forth in claim 1, having a second displacement sensor to form a pair of displacement sensors, the pair being located on a first line passing through said object in opposite positions relative to said object, the coils of one of the displacement sensors being connected in series with the coils of the other displacement sensor.

3. A displacement detecting system as set forth in claim 2 wherein a second pair of displacement sensors in addition to said pair are further located on a second line orthogonally intersecting with said first line in opposite positions with respect to said object, the coils of one of the displacement sensors of said second pair being connected in series with the coils of the other displacement sensor of the second pair.

4. A displacement detecting system as set forth in claim 3, wherein the magnetic fluxes are produced by coils adjacent to each other and located on the different lines to cause the same magnetic pole to be formed on the sides of these coils adjacent to said object.

5. An inductance-type displacement detecting system having a pair of inductance-type displacement sensors for measuring a displacement of an object of magnetic material without any contact with said object, each displacement sensor comprising:
 a core means of magnetic material comprising first and second cores provided adjacent to said object; and
 a pair of coils wound concentrically around respective said first and second cores and connected in series with each other, the inductances of said coils being substantially identical with each other and varying in response to the displacement of said object from a predetermined position, the responsive coils being so wound that the magnetic flux produced by one of the coils runs in a direction opposite to that of the magnetic flux produced by the other coil, and the number of windings and the section of each of the cores being so set that the densities of the responsive magnetic fluxes are equal to each other;
 wherein the pair of coils of one of the displacement sensors are connected in series with the pair of coils of the other of the displacement sensors, and said detecting system further comprising:
 carrier wave generating means connected in series with both pairs of coils; and
 detecting means for detecting a change in electric potential across one of said pairs of coils due to a change in inductance of the other of said pairs of coils in response to the displacement of said object from a predetermined position.

6. A displacement detecting system as set forth in claim 5, wherein each of said first and second cores includes a central magnetic pole, two different concentrically cylindrical magnetic poles provided around said central magnetic pole, and a base portion for connecting these magnetic poles, one of the coils of each respective pair being wound around said central magnetic pole and the other coil being wound between said two magnetic poles.

7. A displacement detecting system as set forth in claim 5, wherein said core means includes a pair of magnetic poles, and a base portion for connecting these magnetic poles, said coils of each respective pair being wound around said magnetic poles, respectively.

8. A displacement detecting system as set forth in claim 5 or 7, wherein said pair of displacement sensors are located on a first line passing through said object in opposite positions relative to said object.

9. A displacement detecting system as set forth in claim 8 further comprising a second pair of displacement sensors in addition to said pair, being further located on a second line orthogonally intersecting with said first line in opposite positions with respect to said object, the coils of one of the displacement sensors of said second pair being connected in series with the coils of the other displacement sensor of the second pair.

10. A displacement detecting system as set forth in claim 9, wherein the magnetic fluxes are produced by coils adjacent to each other and located on the different lines to cause the same magnetic pole to be formed on the sides of these coils adjacent to said object.

* * * * *